March 5, 1957   J. D. MYLES ET AL   2,784,007
RETRACTIBLE SUPPORT FOR TRAILER DRAFT MEANS
Filed March 1, 1955
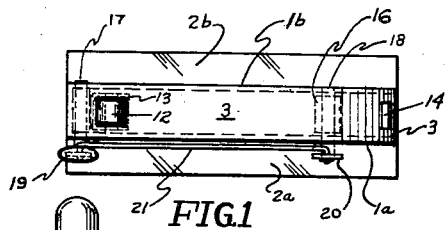
FIG.1
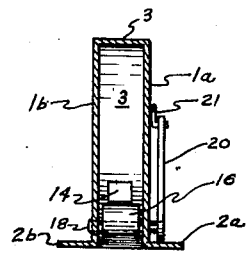
FIG.4
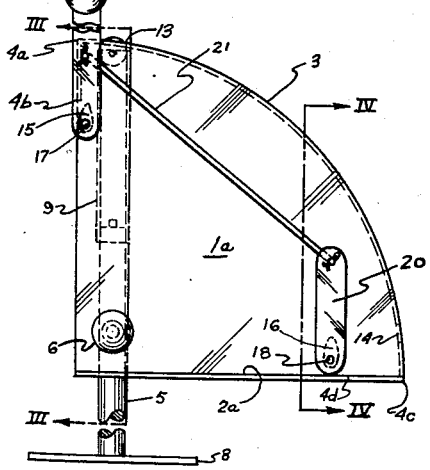
FIG.2
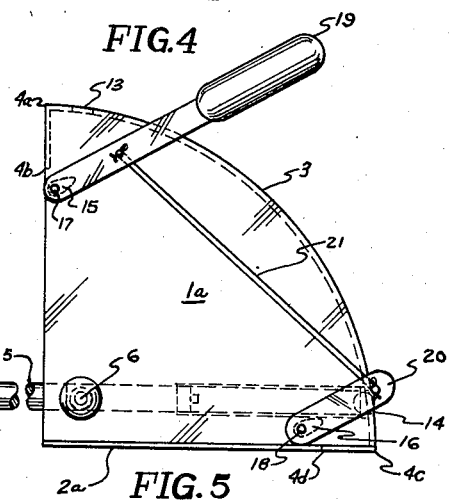
FIG.5
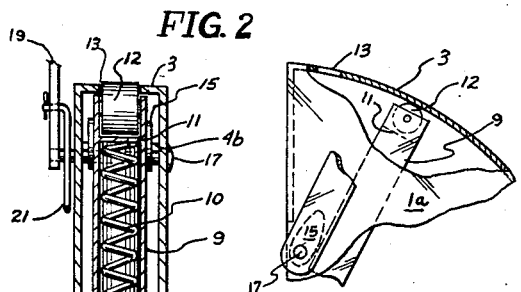
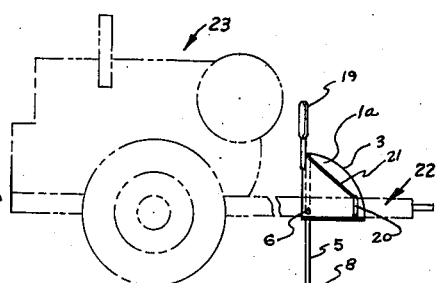
FIG.6   FIG.7
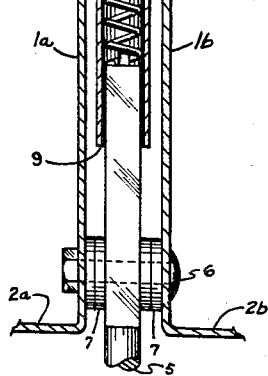
FIG.3
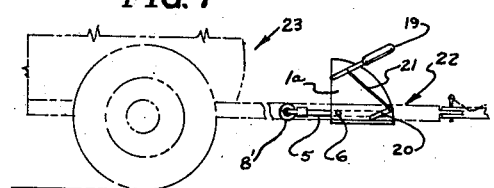
FIG.8
JOHN D. MYLES
EDWIN L. PIERCE
INVENTORS
BY R. W. Hodgson

United States Patent Office 2,784,007
Patented Mar. 5, 1957

2,784,007

RETRACTIBLE SUPPORT FOR TRAILER DRAFT MEANS

John D. Myles, Gardenia, and Edwin L. Pierce, Venice, Calif.

Application March 1, 1955, Serial No. 491,379

8 Claims. (Cl. 280—150.5)

It is an object of the present invention to provide a retractable trailer stand, adapted for permanent attachment to the drawbar of a trailer to furnish a conveniently, swingably, positionable and retractable support for a trailer.

It is a further object of the present invention to provide a trailer stand whose leg means may be firmly maintained, against accidental jarring, in its trailer-supporting position or its ground-clearing position, but may also be manually freed easily from either of said positions through the action of leg-freeing means having a large mechanical advantage.

Other and allied objects will be apparent to those skilled in the art after a careful study of the present specification, the accompanying illustrations, and the appended claims.

To facilitate understanding, reference will be made to the hereinbelow-described drawings, in which:

Fig. 1 is a top plan view of one preferred form of the trailer stand of the present invention with the leg means in vertical position;

Fig. 2 is a side elevation of the device of Fig. 1;

Fig. 3 is a fragmentary sectional view of the trailer stand of Figs. 1 and 2, the section plane and direction being indicated by the line and arrows III—III in Fig. 2;

Fig. 4 is a sectional view of the device of Figs. 1, 2 and 3, the plane of section and direction of view being indicated by the line and arrows IV—IV of Fig. 2;

Fig. 5 is also a side elevation of the device of Fig. 1, showing the change of position of leg means, cam linkage, and handle when the leg means is in its ground-clearing position;

Fig. 6 is a side elevation of a portion of the device of Fig. 1, with portions broken away (and with part of the arcuate strip in section) to show the relationship of the elements of the stop means lying between the plates;

Fig. 7 is a relatively-reduced-size view showing the device of Fig. 1 in use on a trailer; and Fig. 8 is a relatively-reduced-size view showing a modified form of the device of Fig. 1, having a wheel on the leg means, mounted on a trailer and in retracted or ground-clearing position.

Generally speaking, the present invention includes support means (usually made of metal) which, in the specific form illustrated in Figs. 1-6, includes the two metal quadrant-shaped plates 1a, 1b, attachment flanges 2a, 2b and strip 3 joining the arcuate plate edges and also joining the straight edges between reference numerals 4a and 4b and between 4c and 4d. Leg 5 rotates about bearing 6, being spaced from the plates by washers 7. At the lower end of leg 5 is a foot-piece 8 having a large area of contact with the ground. In the illustrated form of the invention, the leg-immobilizing stop means includes sleeve 9 slideably enclosing the upper portion of leg 5. Biasing spring 10 is placed under compression between the upper end of leg 5 and the closed end 11 of sleeve 9. Two sides of sleeve 9 extend upwards and rotatably hold the roller 12, which thus is biased against the arcuate strip 3 and rolls along the inside of said strip when the leg 5 is being swung about its bearing 6. Portions of the strip 3 near each end of the arcuate part, define the detent apertures 13 and 14, into which roller 12 rolls at the end of a full travel of the leg, and in which the roller 12 is forced to remain by the action of the spring 10.

In the leg-freeing means, cams 15 and 16 are integral with their pivots 17 and 18 (which are rotatably held by the plates 1a, 1b) and are so positioned as to be able to respectively engage sleeve 9 when the leg is in one of the other of its firmly maintained vertical or virtually horizontal (ground-clearing) positions. As either cam is rotated, it pulls down and pushes away the sleeve, thus pulling and rolling the roller 12 out of its aperture 13 or 14. Cam 15 may be manually rotated by the handle 19 which (outside plate 1a) is rigidly attached to pivot 17; cam 16 is simultaneously rotated by a mechanical linkage, which in the illustrated form consists of crank 20, rigidly attached (outside plate 1a) to pivot 18, and link bar 21, rotatably attached to the crank 20 and to the handle 19, the distance from its attachment to either of cam pivots 17, 18 being equal.

To install the trailer stand, either of flanges 2a, 2b (in the drawings, flange 2b) may be welded to the underside of drawbar 22 of trailer 23. In Fig. 7 we see the stand as it appears in use with the leg means locked in the vertical position so as to support the trailer.

Fig. 8 shows a modified trailer stand in which the foot-piece 8 is supplanted by wheel 8', which is rotatably attached to the leg 5. The leg means is shown locked in retracted, virtually horizontal position, or ground-clearing position.

When, in either illustrated form, the leg is locked by the stop means in either of its two extreme positions, it may be freed (compare Figs. 1 and 3, 6 and 7) by exerting manual force on handle 19 to engage one of the cams (in the example, cam 15) with the sleeve 9, pulling the sleeve downward and pushing it away, thus forcing the roller 12 out of its aperture (in this case, aperture 13); then the leg 5 may be manually swung to the other extreme position, in which it will automatically lock as the roller 12 enters the aperture (in this case, aperture 14).

Numerous modifications and variations of the present invention will occur to those skilled in the art after a careful study hereof.

For example, the rod-and-sleeve relationship of the leg and extension means, detailed herein, may be reversed: the upper portion of the leg means may form a sleeve enclosing an extension rod biased by a spring within the sleeve. Also, the detent means may be formed by a bulge or excursion of the strip, thus defining an "aperture" in the broad sense of the word. which is intended to be used in this application.

Further, the flange means may be adapted for riveted or bolted attachment to the drawbar as well as for welding, or could even take the form of a clamp fitting onto the drawbar; but since drawbars and other structural members of trailers are manufactured in a variety of shapes and sizes, the weldable attachment illustrated has the advantage of universality.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. A retractable trailer stand adapted for permanent attachment to the drawbar of a vehicle-drawn trailer, to furnish support for said trailer after said trailer has been unhitched from the motive vehicle, comprising: support means firmly attachable to said drawbar including two similar vertical virtually sector-shaped plates and a strip connecting the arcuate portions of the edges of said plates and maintaining said plates virtually parallel; leg means, of which upper and lower portions are distinguished, rotatably connected to said plates between them and near the sector-vertices thereof, said lower portion of said leg means being cooperable with said support means and drawbar to support said trailer when said leg means is swung about said rotatable connection into a virtually vertical position, and being conveniently retractable by being swung into a ground-clearing position: stop means including extension means longitudinally slideably cooperable with said upper portion of said leg means, spring means biasing said extension means toward extended relationship with respect to said leg means, retaining means mounted at the upper end of said extension means so as to forcibly contact and be moveable along said arcuate portion of said strip as said leg means is swung from one of its two said positions into the other, and two detent means cooperable with said strip, spaced by the arc of travel of said retaining means and engageable with said retaining means, whereby through the selective engagement of said retaining means by either of said two detent means said leg means may be selectively maintained in either of its two said positions respectively; leg-freeing means cooperable with said leg means and said stop means, by which said stop means may be deactivated to allow the free movement of said leg means between its two said positions, said leg-freeing means consisting of a pair of cams rotatably mounted between said plates near the two angularly spaced straight sector-edges thereof respectively, a mechanical linkage connecting said cams and a handle by which one of said cams may be rotated, said linkage serving to simultaneously rotate the other said cam, whereby either of said cams may be made to engage said extension means to disengage said retaining means from the corresponding detent means.

2. A retractable trailer stand adapted for permanent attachment to the drawbar of a vehicle-drawn trailer, to furnish support for said trailer after said trailer has been unhitched from the motive vehicle, comprising: support means firmly attachable to said drawbar including two similar vertical virtually sector-shaped plates and a strip connecting the arcuate portions of the edges of said plates and maintaining said plates virtually parallel; leg means, of which upper and lower portions are distinguished, rotatably connected to said plates between them and near the sector-vertices thereof, said lower portion of said leg means being cooperable with said support means and drawbar to support said trailer when said leg means is swung about said rotatable connection into a virtually vertical position, and being conveniently retractable by being swung into a ground-clearing position; stop means including a sleeve longitudinally slideably engaging said upper portion of said leg means, a biasing spring tending to force said sleeve upwardly along said leg means, a roller rotatably mounted at the upper end of said sleeve so as to forcibly contact and be moveable along said arcuate portion of said strip as said leg means is swung from one of its two said positions into the other, and two detent means each defining an aperture in said strip into which said roller may partially enter, said apertures being spaced by the arc of travel of said roller, whereby through the selective engagement of said roller by said apertures said leg means may be selectively maintained in either of its two positions respectively; leg-freeing means cooperable with said leg means and said stop means, by which said stop means may be deactivated to allow the free movement of said leg means between its two said positions.

3. A retractable trailer stand adapted for permanent attachment to the drawbar of a vehicle-drawn trailer, to furnish support for said trailer after said trailer has been unhitched from the motive vehicle, comprising: support means firmly attachable to said drawbar including two similar vertical virtually sector-shaped plates and a strip connecting the arcuate portions of the edges of said plates and maintaining said plates virtually parallel; leg means, of which upper and lower portions are distinguished, rotatably connected to said plates between them and near the sector-vertices thereof, said lower portion of said leg means being cooperable with said support means and drawbar to support said trailer when said leg means is swung about said rotatable connection into a virtually vertical position, and being conveniently retractable by being swung into a ground-clearing position; stop means including a sleeve longitudinally slideably engaging said upper portion of said leg means, a biasing spring tending to force said sleeve upwardly along said leg means, a roller rotatably mounted at the upper end of said sleeve so as to forcibly contact and be moveable along said arcuate portion of said strip as said leg means is swung from one of its two said positions into the other, and two detent means each defining an aperture in said strip into which said roller may partially enter, said apertures being spaced by the arc of travel of said roller, whereby through the selective engagement of said roller by said apertures said leg means may be selectively maintained in either of its two positions respectively; leg-freeing means cooperable with said leg means and said stop means, by which said stop means may be deactivated to allow the free movement of said leg means between its two said positions, said leg-freeing means consisting of a pair of cams rotatably mounted between said plates near the two angularly spaced straight sector-edges thereof respectively, a mechanical linkage connecting said cams and a handle by which one of said cams may be rotated, said linkage serving to simultaneously rotate the other said cam, whereby either of said cams may be made to engage said sleeve to disengage said roller from the corresponding aperture.

4. A retractable trailer stand adapted for permanent attachment to the drawbar of a vehicle-drawn trailer, to furnish support for said trailer after said trailer has been unhitched from the motive vehicle, comprising: metal support means including two similar vertical virtually quadrant-shaped sector plates, flange means weldable to said drawbar and fixedly joined to one of said plates, and a strip connecting the arcuate portions of the edges of said plates and maintaining said plates virtually parallel; leg means of which upper and lower portions are distinguished, and bearing means connecting said leg means rotatably to said plates at a point near the quadrant-vertices thereof, said lower portion of said leg means thus being cooperable with said support means and drawbar to support said trailer when said leg means is swung about said bearing into a virtually vertical position, and being conveniently retractable by being swung into a virtually horizontal position; stop means including extension means longitudinally slideably cooperable with said upper portion of said leg means, spring means biasing said extension means toward extended relationship with respect to said leg means, retaining means mounted at the upper end of said extension means so as to forcibly contact and be moveable along said arcuate portion of said strip as said leg means is swung from one of its two said positions into the other, and two detent means cooperable with said strip, spaced by the arc of travel of said retaining means and engageable with said retaining means, whereby through the selective engagement of said retaining means by either of said two detent means said leg means may be selectively maintained in either of its two said positions respectively; leg-freeing means cooperable with said leg means and said stop means, by which said stop means may be deactivated to allow the free movement of said leg means between its two said positions, said leg-freeing means consisting of a pair of cams rotatably mounted between said plates near the two angularly spaced straight sector-edges thereof respectively, a mechanical linkage connecting said cams and a handle by which one of said cams may be rotated, said linkage serving to simultaneously rotate the other said cam, whereby either of said cams may be made to engage said extension means to disengage said retaining means from the corresponding detent means.

5. A retractable trailer stand adapted for permanent attachment to the drawbar of a vehicle-drawn trailer, to furnish support for said trailer after said trailer has been unhitched from the motive vehicle, comprising: metal support means including two similar vertical virtually quadrant-shaped sector plates, flange means weldable to said drawbar and fixedly joined to one of said plates, and a strip connecting the arcuate portions of the edges of said plates and maintaining said plates virtually parallel; leg means of which upper and lower portions are distinguished, and bearing means connecting said leg means rotatably to said plates at a point near the quadrant-vertices thereof, said lower portion of said leg means thus being cooperable with said support means and drawbar to support said trailer when said leg means is swung about said bearing into a virtually vertical position, and being conveniently retractable by being swung into a virtually horizontal position; stop means including a sleeve longitudinally slideably engaging said upper portion of said leg means, a biasing spring tending to force said sleeve upwardly along said leg means, a roller rotatably mounted at the upper end of said sleeve so as to forcibly contact and be moveable along said arcuate portion of said strip as said leg means is swung from one of its two said positions into the other, and two detent means each defining an aperture in said strip into which said roller may partially enter, said apertures being spaced by the arc of travel of said roller, whereby through the selective engagement of said roller by said apertures said leg means may be selectively maintained in either of its two positions respectively; leg-freeing means cooperable with said leg means and said stop means, by which said stop means may be deactivated to allow the free movement of said leg means between its two said positions.

6. A retractable trailer stand adapted for permanent attachment to the drawbar of a vehicle-drawn trailer, to furnish support for said trailer after said trailer has been unhitched from the motive vehicle, comprising: metal support means including two similar vertical virtually quadrant-shaped sector plates, flange means weldable to said drawbar and fixedly joined to one of said plates, and a strip connecting the arcuate portions of the edges of said plates and maintaining said plates virtually parallel; leg means of which upper and lower portions are distinguished, and bearing means connecting said leg means rotatably to said plates at a point near the quadrant-vertices thereof, said lower portion of said leg means thus being cooperable with said support means and drawbar to support said trailer when said leg means is swung about said bearing into a virtually vertical position, and being conveniently retractable by being swung into a virtually horizontal position; stop means including a sleeve longitudinally slideably engaging said upper portion of said leg means, a biasing spring tending to force said sleeve upwardly along said leg means, a roller rotatably mounted at the upper end of said sleeve so as to forcibly contact and be moveable along said arcuate portion of said strip as said leg means is swung from one of its two said positions into the other, and two detent means each defining an aperture in said strip into which said roller may partially enter, said apertures being spaced by the arc of travel of said roller, whereby through the selective engagement of said roller by said apertures said leg means may be selectively maintained in either of its two positions respectively; leg-freeing means cooperable with said leg means and said stop means, by which said stop means may be deactivated to allow the free movement of said leg means between its two said positions, said leg-freeing means consisting of a pair of cams rotatably mounted between said plates near the two angularly spaced straight sector-edges thereof respectively, a mechanical linkage connecting said cams and a handle by which one of said cams may be rotated, said linkage serving to simultaneously rotate the other said cam, whereby either of said cams may be made to engage said sleeve to disengage said roller from the corresponding aperture.

7. A retractable trailer stand adapted for permanent attachment to the drawbar of a vehicle-drawn trailer, to furnish support for said trailer after said trailer has been unhitched from the motive vehicle, comprising: support means firmly attachable to said drawbar including two similar vertical virtually sector-shaped plates and a strip connecting the arcuate portions of the edges of said plates and maintaining said plates virtually parallel; leg means, of which upper and lower portions are distinguished, rotatably connected to said plates between them and near the sector-vertices thereof, said lower portion of said leg means being cooperable with said support means and drawbar to support said trailer when said leg means is swung about said rotatable connection into a virtually vertical position, and being conveniently retractable by being swung into a ground-clearing position; stop means including extension means longitudinally slideably cooperable with said upper portion of said leg means, spring means biasing said extension means toward extended relationship with respect to said leg means, retaining means mounted at the upper end of said extension means so as to forcibly contact and be moveable along said arcuate portion of said strip as said leg means is swung from one of its two said positions into the other, and two detent means cooperable with said strip, spaced by the arc of travel of said retaining means and engageable with said retaining means, whereby through the selective engagement of said retaining means by either of said two detent means said leg means may be selectively maintained in either of its two said positions respectively; leg-freeing means cooperable with said leg means and said stop means, by which said stop means may be deactivated to allow the free movement of said leg means between its two said positions, said leg-freeing means consisting of a pair of cams rotatably mounted between said plates near the two angularly spaced straight sector-edges thereof respectively, a mechanical linkage connecting said cams and a handle by which one of said cams may be rotated, said linkage serving to simultaneously rotate the other said cam, whereby either of said cams may be made to engage said extension means to disengage said retaining means from the corresponding detent means, and wheel means rotatably mounted at the lower end of said leg means to allow the trailer to be moved easily when said leg means is in its vertical position.

8. A retractable trailer stand adapted for permanent attachment to the drawbar of a vehicle-drawn trailer, to furnish support for said trailer after said trailer has been unhitched from the motive vehicle, comprising: metal support means including two similar vertical virtually quadrant-shaped sector plates, flange means weldable to said drawbar and fixedly joined to one of said plates, and a strip connecting the arcuate portions of the edges of said plates and maintaining said plates virtually parallel; leg means of which upper and lower portions are distinguished, and bearing means connecting said leg means rotatably to said plates at a point near the quadrant-vertices thereof, said lower portion of said leg means thus being cooperable with said support means and drawbar to support said trailer when said leg means is swung about said bearing into a virtually vertical position, and being conveniently retractable by being swung into a virtually horizontal position; stop means including a sleeve longitudinally slideably engaging said upper portion of said leg means, a biasing spring tending to force said sleeve upwardly along said leg means, a roller rotatably mounted at the upper end of said sleeve so as to forcibly contact and be moveable along said arcuate portion of said strip as said leg means is swung from one of its two said positions into the other, and two detent means each defining an aperture in said strip into which said roller may partially enter, said apertures being spaced by the arc of travel of said roller, whereby through the selective engagement of said roller by said apertures said leg means may be selectively maintained in either of its two positions respectively; leg-freeing means cooperable with said leg means and said stop means, by which said stop means may be deactivated to allow the free movement of said leg means between its two said positions, said leg-freeing means consisting of a pair of cams rotatably mounted between said plates near the two angularly spaced straight sector-edges thereof respectively, a mechanical linkage connecting said cams and a handle by which one of said cams may be rotated, said linkage serving to simultaneously rotate the other said cam, whereby either of said cams may be made to engage said sleeve to disengage said roller from the corresponding aperture; and wheel means rotatably mounted at the lower end of said leg means to allow the trailer to be moved easily when said leg means is in its vertical position.

References Cited in the file of this patent

UNITED STATES PATENTS

| | | |
|---|---|---|
| 2,571,390 | Strand | Oct. 16, 1951 |
| 2,595,453 | Gilmore | May 6, 1952 |